US007206846B1

(12) United States Patent
Dini et al.

(10) Patent No.: US 7,206,846 B1
(45) Date of Patent: Apr. 17, 2007

(54) METHOD AND APPARATUS FOR ADAPTIVELY COUPLING PROCESSING COMPONENTS IN A DISTRIBUTED SYSTEM

(75) Inventors: Petre Dini, San Jose, CA (US); Andrew G. Harvey, San Jose, CA (US); Cosmin Dini, San Jose, CA (US); Manuela Popescu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 851 days.

(21) Appl. No.: 10/426,206

(22) Filed: Apr. 29, 2003

(51) Int. Cl.
*G06F 15/16* (2006.01)
*G06F 15/173* (2006.01)

(52) U.S. Cl. ...................... 709/228; 709/224; 709/225; 709/232; 709/237

(58) Field of Classification Search ................ 709/203, 709/220, 223, 224, 227, 232, 237
See application file for complete search history.

(56) References Cited

U.S. PATENT DOCUMENTS

| | | | | |
|---|---|---|---|---|
| 6,304,905 | B1 * | 10/2001 | Clark | 709/224 |
| 2002/0091802 | A1 * | 7/2002 | Paul et al. | 709/220 |
| 2003/0084140 | A1 * | 5/2003 | Takeuchi et al. | 709/223 |
| 2003/0088650 | A1 * | 5/2003 | Fassold et al. | 709/220 |
| 2003/0093534 | A1 * | 5/2003 | Hartmann et al. | 709/227 |
| 2003/0191843 | A1 * | 10/2003 | Balissat et al. | 709/227 |
| 2004/0030746 | A1 * | 2/2004 | Kavacheri et al. | 709/203 |

OTHER PUBLICATIONS

Anderson et al., "Making Autonomic Computing Systems Accountable: The Problem of Human Computer Interaction", Database and Expert Systems Applications, 2003. Proceedings. 14th International Workshop on Sep. 1-5, 2003, pp. 674-680.*

Dong et al., "Autonomia: An Autonomia Computing Environment", Performance, Computing, and Communications Conference, 2003. Conference Proceedings of the 2003 IEEE International Apr. 9-11, 2003, pp. 61-68.*

(Continued)

*Primary Examiner*—Rupal Dharia
*Assistant Examiner*—Quang N. Nguyen
(74) *Attorney, Agent, or Firm*—Hickman Palermo Truong & Becker LLP

(57) ABSTRACT

A method is disclosed for adaptively coupling processing components in a distributed system. In one aspect, a second component requests an interaction with a first component by sending a service access request to access a first service of the first component. The service access request specifies parameters relating to a proposed level of coupling between the first component and the second component. The second component receives a service response from the first component; the service response specifies counter-proposed parameters relating to a proposed level of coupling between the first component and the second component. The second component determines whether the service response indicates that the first service may be provided. If so, then an agreed-upon level of coupling is established between the first component and second component, and the components interact to receive the service. The level of coupling among the components may be re-negotiated at any time by exchanging values in a coupling context. As a result, a component can selectively and with fine granularity allow other components to access its data or services.

17 Claims, 7 Drawing Sheets

OTHER PUBLICATIONS

Harald Gall, et al., "Detection of Logical Coupling Based on Product Release History," in Proceedings of the International Conference on Software Maintenance 1998 (ICSM '98), pp. 1-10.
R. Broos, et al., MIAMI Project, "Mobile Agent Platform Assessment Report," http://www.fokus.gmd.de/rsearch/cc/ecco/climate/ap~documents/miami-agplatf.pdf, pp. 1-58.
Kevin Dooley, "Complex Adaptive Systems: A Nominal Definition," 1996, 3 pages.
Laura Pearlman, et al., "A Community Authorization Service for Group Collaboration," undated, 10 pages.
Liliana Ardissono, et al., "An adaptive system for the personalized access to news," ISSN 0921-7126, undated, pp. 1-19.
William B. McNatt, et al., "Coupling of Design Patterns" Common Practices and Their Benefits to appear in Proc. Computer Software & Applications Conf. COMPSAC 2001, Oct. 2001, pp. 1-6.
Zhenyi Jin, et al., "Coupling-based Criteria for Integration Testing," Jul. 29, 1998, pp. 1-25.
David P. Darcy, et al., "Software Complexity: Toward a Unified Theory of Coupling and Cohesion," undated, pp. 1-12.
Glenda H. Eoyang, Ph.D., et al., "Evaluation in a Complex Adaptive System," Apr. 30, 1998, pp. 1-21.
Paul Horn, International Business Machines Corporation, "Autonomic Computing: IBM's Perspective on the State of Information Technology," 2001, http://researchweb.watson.ibm.com, pp. 1-39.
Ian Foster, et al., "A Quality of Service Architecture that Combines Resource Reservation and Application Adaptation," undated, pp. 1-8.
D. O'Mahony, et al., "An Adaptable Node Architecture for Future Wireless Networks," undated, pp. 1-13.

* cited by examiner

METHOD AND APPARATUS FOR ADAPTIVELY COUPLING PROCESSING COMPONENTS IN A DISTRIBUTED SYSTEM

FIELD OF THE INVENTION

The present invention generally relates to data processing involving components of a distributed system. The invention relates more specifically to a method and apparatus for adaptively coupling processing components in a distributed system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a data processing system, various components may interact to request services from other components or provide services to other components in a system. A "component" is an entity that can carry a unique identifier and provide a service, and may be software, hardware, or a combination of hardware and software. Other examples of "components" include modules, processes, agents, Object Oriented classes (referred to hereinafter as "OO classes"), instances of Object Oriented classes (referred to hereinafter as "OO instances"), programs, etc.

For example, a computer user may want to move a file into a particular folder. The folder needs to allocate sufficient storage space in order to receive the file in that folder. When the user initiates the move, a process is activated to perform the move operation. The process interacts with the folder to determine if the folder has sufficient space for storing the file. In this example, the process is a component that requests a service, i.e., moving the file, and the folder is a component that provides the service, i.e., receiving and storing the file.

Components that request services and the components that provide the requested services are "coupled" to each other because they exchange information. Components may be tightly coupled or loosely coupled. Generally, coupling may be defined as the measure of the strength of association established by a connection from one module to another, as described in W. Stevens, G. Myers, L. Constantine, Structured Design, IBM Systems Journal, vol. 13, pp. 115–139, 1974. Relatedness of program parts is how the concept is widely understood, as in R. G. Fichman, C. F. Kemerer, Adoption of Software Engineering Process: the case of object orientations, SMR, vol. 34, pp. 7–22, 1993; S. R. Chidamber, C. F. Kemerer, A metrics suite for object oriented design, IEEE Transaction on Software Engineering, vol. 20, pp. 476–493, 1994.

The nature of the coupling between the components is determined, for example, by the type or level of services that are requested or provided. For example, a first process may provide a second process unlimited access to its data, however, the first process may provide a third process only limited access to its data. The first process has a different level of coupling with the second process than with the third process. Thus, in this example, the level of the service provided determines the nature of the coupling.

In a second example, a folder may require that one file is password-protected in order to move the file the folder. However, the folder may require that another file be in a particular format. Thus, in this example, the type of service provided determines the nature of the coupling between the folder and the files. Components that request or provide services need to communicate to one another the nature of coupling that they permit.

In one past approach used in the context of programming in procedural languages, coupling has been defined in terms of one of a plurality of "levels of coupling":

(1) Content: one module branches into a second module to modify the data or the instructions of the second module, (2) Common: Where two modules access the same global variable, (3) External: two modules access global variables, which are external to the two modules, (4) Control: one module exercises control over a second module by passing information into a second module that affects the behavior of the second module, and the information may be a parameter or instructions for the second module, (5) Stamp: two modules receive the same record as a parameter, (6) Data: two modules communicate via parameters, and (7) None: none of the above layers apply to the two modules in question.

However, this approach has numerous disadvantages. First, the coupling levels approach has been used only with procedural programs or modules. The coupling levels approach cannot be used for other types of components, such as OO instances or agents. Second, the nature of the coupling between the modules is static. Typically, the nature of the coupling is hard-coded into the modules and does not change while the modules are executing.

The Common Object Request Broker Architecture or "CORBA" has been used in a second past approach for components to communicate the nature of allowed coupling. In the CORBA approach, OO instances register with a broker process, indicating what services the OO instances provide or request. When an OO instance registers with the broker requesting a certain set of services, the broker provides information to the requesting OO instance indicating which OO instances provide those services. Thus, the broker assists newly introduced objects in finding needed services.

However, this approach also has numerous disadvantages. First, CORBA requires an extensive infrastructure or "middleware" that includes a broker. Second, this approach only applies to OO instances. Third, the nature of the coupling is static. For example, once the OO instances have registered with the broker, they are not allowed to modify the nature of their coupling. Therefore, the CORBA approach cannot account for changes in objects or services. Further, the CORBA approach is workable only for OO instances and not for other kinds of components.

In still another past approach, a self-controlled, non-brokered mechanism is provided for determining coupling; this approach is used, for example, in platforms based on mobile agents, such as Voyager, Grasshopper, and Jini. These platforms control the level of interaction of agents internally by having a homogeneous environment in which all mobile agents are the same, and self-scheduling execution of processes and sub-processes on different servers. Both the form of the internal data structures and the level of interaction of agents are static.

Coupling involves several aspects of express inter-component relationships. Some of these relationships are statically pre-tuned, at the time that component specifications are created, such type of connection, complexity of an interface, type of information flow along the connection. Other relationships are dynamically set, such as binding time, duration of the connection, coupling state, etc.

However, regardless of the kind of static coupling that may be defined by design, the right behavior of components is best determined when the coupling actually executes. Further, for static coupling to succeed, the specification phase of a component must correctly and explicitly specify particular types of couplings, to handle them automatically. However, accurate specification rarely occurs. Thus, there is a need for approaches that allow interacting components to dynamically exchange and set the nature of the coupling that they use.

Adaptation is a property of an entity to constrain its behavior according to environmental conditions. An algorithm that can learn and change its behavior by comparing the results of its actions with the goals that it is designed to achieve is called an "adaptive algorithm." An "adaptive system" can understand and predict actions looking for patterns within its behavior or within its environment.

Special adaptive systems have been designed in an ad-hoc manner, based on a narrow set of requirements, such as described in L. Ardissono, L. Console, I. Torre, An Adaptive System for the personalized access to news, AI Communications, ISSN 0921-7126, IOS Press; I. Foster, A. Roy, A QoS Architecture that Combines Resource Reservation and Application Adaptation, IWQoS 2000; or Pearlman, V. Welch, I Foster, C. Kesselman, S. Tuecke, A Community Authorization Service for Group Collaboration, ISI, The University of Southern California.

Further, most prior approaches focus on adaptive control in which three distinct mechanisms are used: (i) actuators that permit online control of resource allocations, application behavior, etc.; (ii) sensors that allow monitoring of status, behavior, or other parameters; and (iii) decision procedures that allow entities to respond to sensor information, by invoking actuators.

However, these approaches have not been applied in the context of service coupling. Indeed, there is relatively little literature at all concerning coupling in highly distributed software architectures. Also, little or no solutions exist for monitoring and controlling coupling behavior in systems with an embedded degree of automation. In these cases, coupling answers the question of how much of one system component must be known in order to understand another component(s).

Between loosely coupled components and tightly coupled components, many discrete levels have been identified. It is assumed that two components may have a predefined level of coupling or a few levels can be pre-tuned to be switched. Loosely coupled components have very little information or none on each other. Generally, only information is passed. In general, this kind of interaction is initiated through a trader or other special component mediating the interactions. Tightly coupled components/systems require the interacting entities have detailed information on interface type, interface name, type of interface matching, locations of entities, types of entities, and names of entities.

In programming, coupling as an abstract concept is manifested in the need to consider something about another module when coding or modifying another component. However, extensions in programming paradigms such as agent based programming, context-based programming, nomadic-process-based programming, delegation-based programming, have changed and complicated the coupling landscape. The interaction of components is now extremely diversified and complex, especially when several of these technologies are simultaneously used. Coding is no longer the only concern; interaction types and behavior become a concern as well.

Further, coupling greatly complicates testing of software components, even when coupling is addressed in a static form. Code-based coupling techniques have been used as a measure to derive testing methods for system's structural complexity. In large, monolithic systems comprising millions of lines of code, testing at the code level based on classic theory of related tasks and their interaction become problematic.

Classical coupling approaches are statically defined, mainly based on the type of interchanged data, and are used only in the early stages of the software design lifecycle, such as the specification stage. There are very few concerns about the behavior of interacting components, or to their interacting behavior, when the interaction occurs. As a result, distributed architectures vary from those that provide statically defined, loose coupling to those with tight coupling ranges. No mechanisms have been possible to establish an adequate coupling, in a dynamic way, since component behaviors may change, or new components with unknown behaviors may join an existing community of components. As a result, no automatic management systems have been allowed to capture and remedy potential incorrect interaction at run time.

Based on the foregoing, there is a clear need for managing coupling between components in a way that is not static and not limited to a particular type of component. In particular, there is a need for a way to adaptively or dynamically couple components in a distributed system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
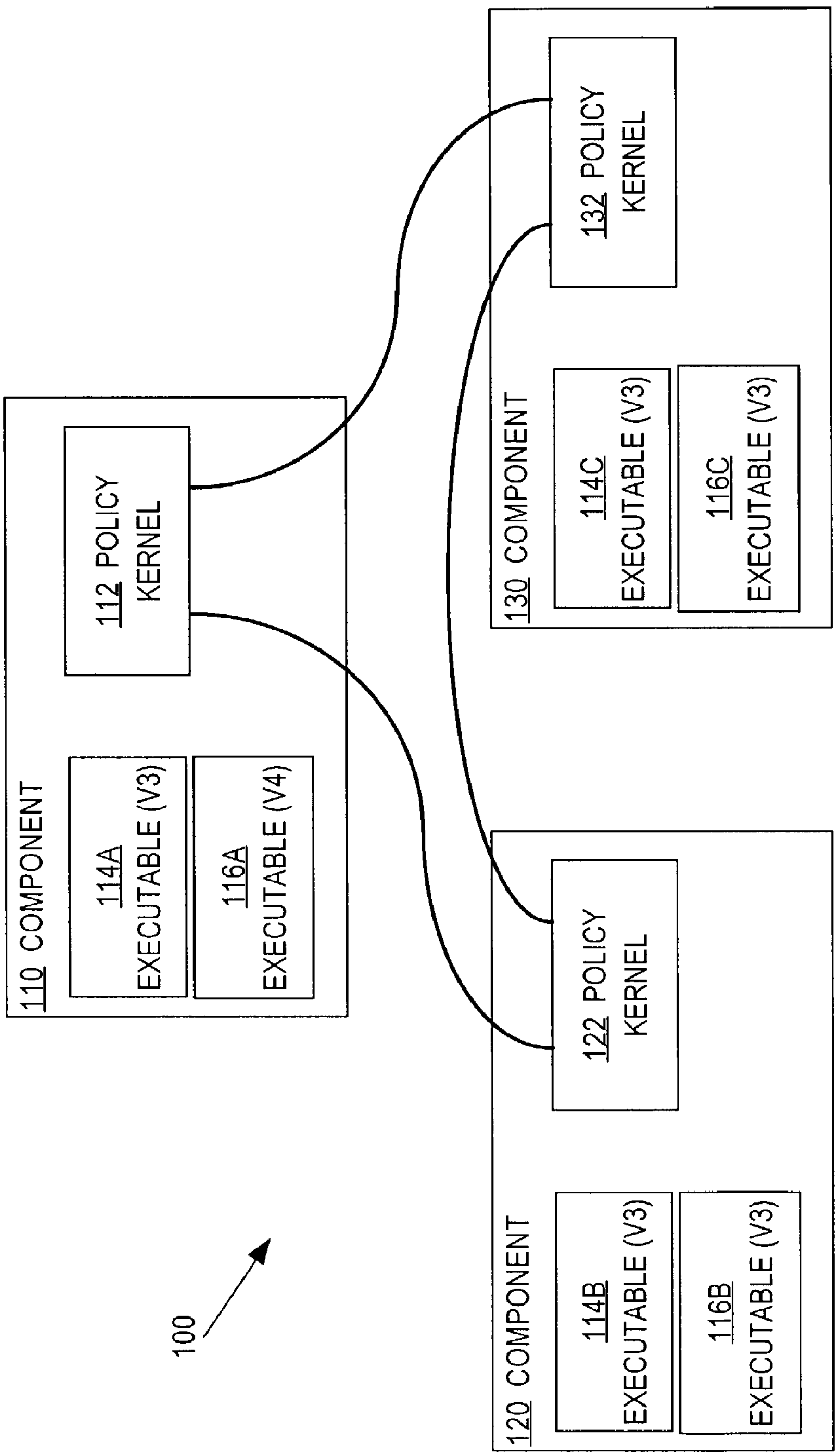
FIG. 1A is a block diagram that illustrates a plurality of coupled components.

A method and apparatus for adaptively coupling components in a distributed system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Adaptively Coupling Components
3.1 Method of Negotiating Adaptive Coupling
3.2 Details of Coupling Context
3.3 Examples of Use
3.4 Improvements Over Past Approaches
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for adaptively coupling processing components in a distributed system. A second component requests an interaction with a first component by sending a service access request to access a first service of the first component. The service access request specifies parameters relating to a proposed level of coupling between the first component and the second component. The second component receives a service response from the first component; the service response specifies counter-proposed parameters relating to a proposed level of coupling between the first component and the second component. The second component determines whether the service response indicates that the first service may be provided. If so, then an agreed-upon level of coupling is established between the first component and second component, and the components interact to receive the service.

The level of coupling among the components may be re-negotiated at any time by exchanging values in a coupling context. As a result, a component can selectively and with fine granularity allow other components to access its data or services.

In general, the approaches described herein provide processes for achieving adaptive component coupling, and describe a coupling context data structure for establishing adaptive component coupling. In dynamically adaptive component coupling as described herein, interacting components can negotiate and establish the level of coupling that is appropriate or desired. Further, a management system can determine the status of coupling and act on it or respond to it. Dynamically adaptive component coupling as described herein provides a foundation for enabling distributed components to interact.

In other aspects, the invention encompasses a computer apparatus and a computer-readable medium configured to carry out the foregoing steps.

2.0 Structural and Functional Overview

Adaptive coupling as described herein provides dynamic and context-based coupling in component-based system or software architectures. Using adaptive coupling, facets of system behavior are captured that otherwise cannot be captured using prior coupling concepts. Further, adaptive coupling allows monitoring and management systems to seamlessly handle adaptive systems through component interactions.

FIG. 1A is a block diagram that illustrates a plurality of coupled components. A distributed system 100 comprises components 110, 120, 130. Each component is an entity that can be uniquely identified and can provide a service. A component may be software, hardware, or a combination of hardware and software. Software components may be implemented using a procedural programming language or any non-procedural programming system or environment. Examples of components include systems, devices, operating systems, applications, modules, processes, agents, classes, instances, programs, routines, etc.

Each component 110, 120, 130 comprises one or more first executables 114A, 114B, 114C, respectively, and one or more second executables 116A, 116B, 116C. Typically the first executables are associated with one application and the second executables are associated with a second application. Further, a particular executable of one component may need to interact with another executable of another component with one or more degrees of coupling. Each component 110, 120, 130 further comprises a policy kernel 112, 122, 132, respectively, which is responsible for negotiating the specific degree of coupling suitable for interactions of executables and components.

Figure 1B:
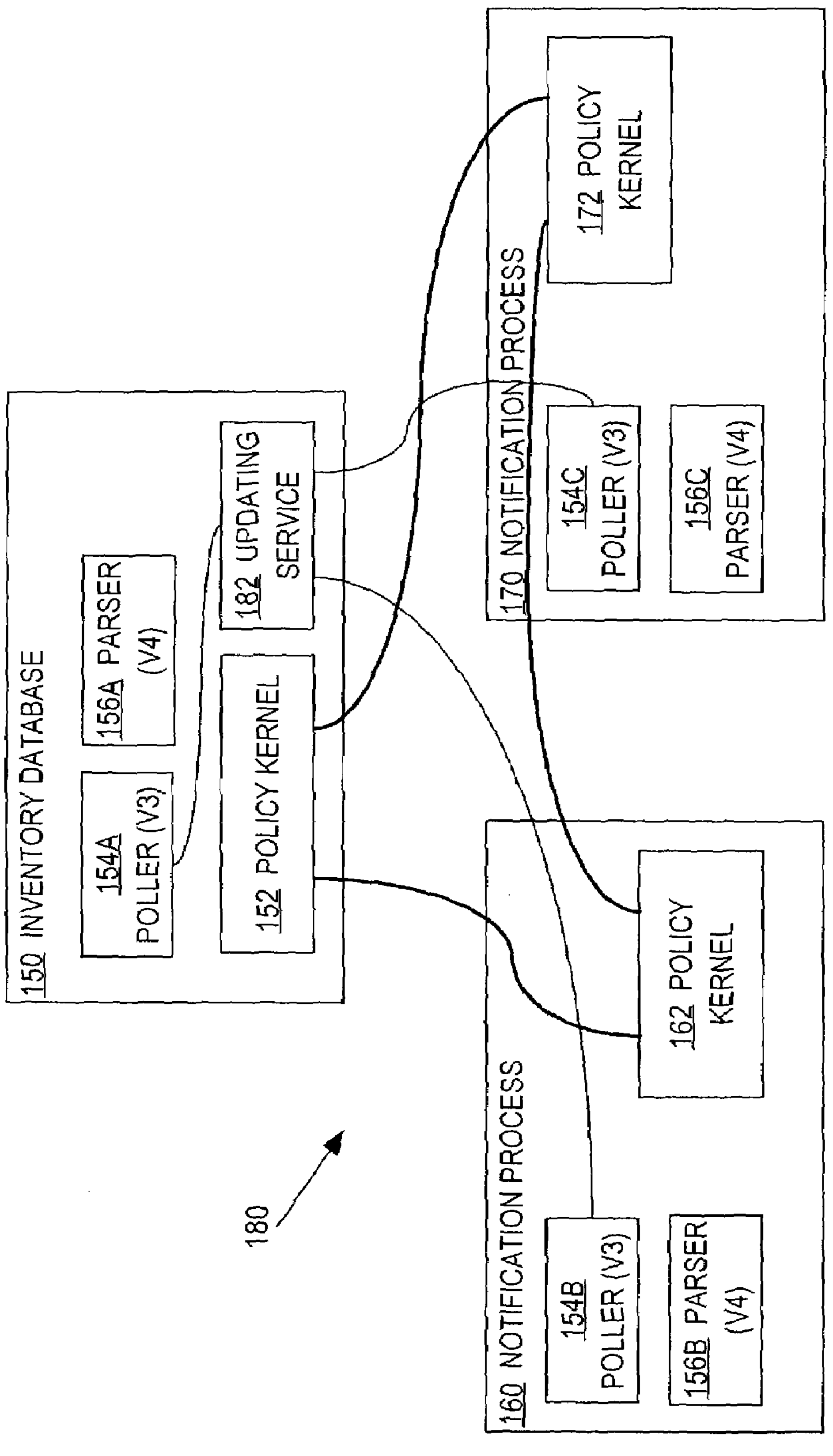
FIG. 1B is a block diagram that illustrates a distributed software notification system comprising coupled components.

FIG. 1B is a block diagram that illustrates a distributed software notification system comprising coupled components. A distributed system 180 comprises a network device inventory database 150, a first notification process instance 160 and a second notification process instance 170. The database 150 and process instances 160, 170 each host a poller 154A, 154B, 154C, respectively, and a parser 156A, 156B, 156C, respectively. In one specific embodiment, database 150 is a network device inventory database as available in network management products of Cisco Systems, Inc., San Jose, Calif., and process instances 160, 170 are instances of the C-NOTE notification application available from Cisco Systems. C-NOTE is an application that is identified herein simply for the purpose of providing a clear example; however, other embodiments may be used in connection with any other applications or processes.

The pollers and parsers are executable software modules and may be deployed in one of a plurality of different versions, such as version 3 ("V3") or version 4 ("V4"). Typically the database 150 hosts the latest version of the poller and parser, and but there is a need to periodically install an update to the poller or parser in each of the process instances 160, 170. An update service 182 may perform updates to the notification processes 160, 170.

Each version of the poller or parser may need to negotiate a degree of coupling that is permitted with respect to communications with another version of a poller or parser. The inventory database 150, and notification processes 160, 170 each host a policy kernel 152, 162, 172, respectively, that is responsible for negotiating levels of coupling among processes. Examples of factors that can be negotiated with respect to a level of coupling include the time of interaction of components, type of interaction of components, whether one component can modify an aspect of another component, whether one component is authorized to use particular services of another component, and whether one component can access data within another component.

Figure 1C:
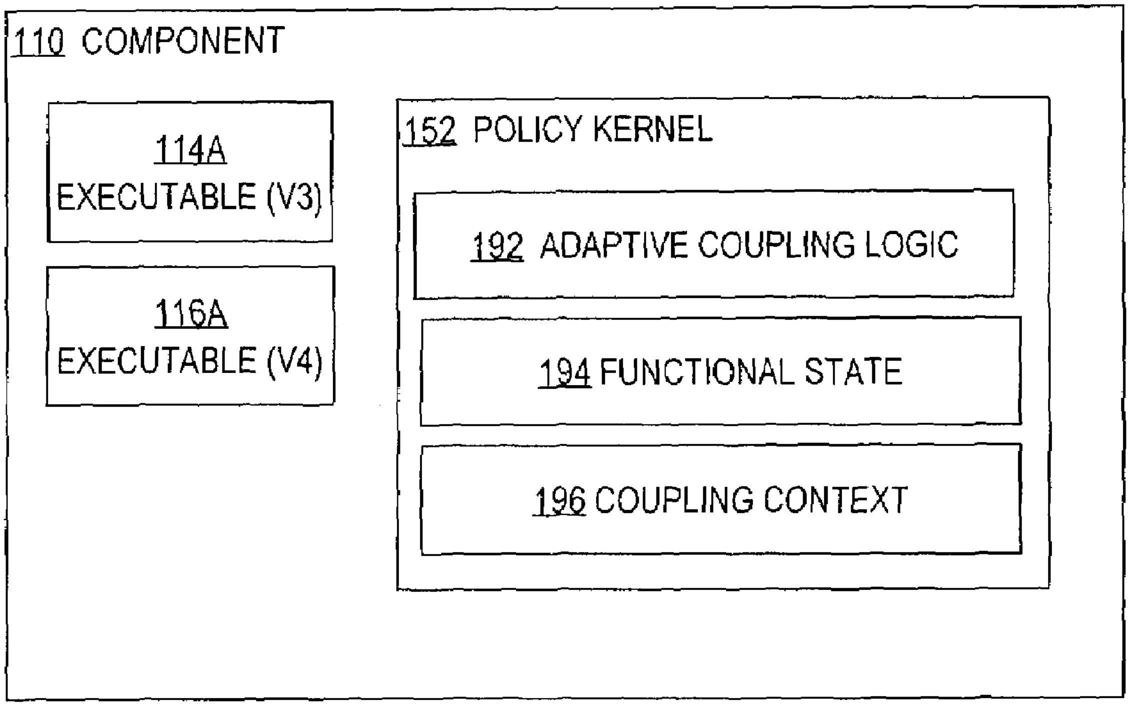
FIG. 1C is a block diagram showing elements of an example policy kernel.

FIG. 1C is a block diagram showing elements of an example policy kernel. Each policy kernel 112 comprises adaptive coupling logic 192 for negotiating coupling, a functional state 194 and a coupling context 196. The functional state 194 and coupling context 196 generally comprise information needed to perform a negotiation of a level of coupling with another component or executable. In one specific embodiment, each policy kernel stores a description of the information needed for negotiation in a format that defined by a grammar in Backus-Naur form (BNF).

The functional state 194, which is a dynamic state, reflects the coupling status of components at a given moment. As an example, a functional state may be defined as a value in Backus-Naur form as:

functional_state::=<allowed><initialization><established><negotiation/adapting ><in_test><passive><suspended><not_allowed>

The state of an instance in terms of adaptive coupling is used to define control and management policies including testing and validation of coupling behavior. Not all types of coupling may be allowed, by design, to transit through all enumerated state values. Therefore, constraints may govern the context for establishing or negotiating, adapting, and testing an already established coupling. The allowed values for the functional state of a coupling are intended to cover all relevant cases.

In one embodiment, coupling context 196 is a vector representation of the semantics associated to with a particular coupling of specific components. At any particular moment, the coupling context defines a set of properties that characterize the coupling. In one embodiment, a coupling context may be defined as:

coupling_context::=<context_type> <data><interface><entity><duration><refused_set> <trust_level><location><conveyer><accepted_method><accepted traffic_type><constraints>

In one embodiment, the <refused_set> value defines what kinds of services to components cannot use or access, based on perceived abnormal behavior. Upon initialization, for both components involved in a coupling, the refused set is empty.

The <constraints> argument defines coupling constraints, as seen between types of components, at the system design phase. Coupling constraints enable coupling to be negotiated among unknown components, or among components the features of which are not known a priori. In general, the constraints argument defines interactions that are forbidden. Therefore, an implementation is required to check the constraints argument to determine if a particular interaction is permitted. Values of the constraints argument may be implemented as arithmetical or Boolean expressions over context arguments. For example, constraints values could be data_type not REAL, volume <500/min, trust level>=medium, etc.

A context_type defines the type of coupling or the reason the coupling is initialized. A context_type may be either computational, testing, control, or decisional. The context_type is correlated with what type of interface plays a role in a given coupling and the duration of the coupling. For example, a test context should not last hours if the status of the coupling is not <in_test>.

Features of a coupling may designate properties that are specific to a particular context. For example, network-related properties such as access points may be specified. Further, policy-access-points may be specified, providing support for cases where the context type is decisional and the interaction is with an external policy-based management component. In this case, the interaction is achieved through a designated interaction point.

Two components may experience various degrees of coupling according to the coupling context. An implementation is expected to support the fact that a system specification uses dynamically adaptive coupling. As an example, a nomadic-code-based loose coupling instantiation requires those services dealing with nomadic-code.

In this arrangement, components exchange messages that conform to a standardized format. Further, the initial nature of coupling is negotiated during execution of the components, and the nature of coupling may be re-negotiated at any time. Thus, embodiments provide dynamic negotiation. Since the messages conform to a standardized format, the components need not belong to any particular type or platform. Further, since the nature of coupling can be negotiated and re-negotiated during execution, the coupling is not static.

Messages communicated by components may be requests for services, responses to the requests for services, requests for a different type or level of service when previously requested services are denied, and requests to re-negotiate services previously agreed upon.

Figure 2:
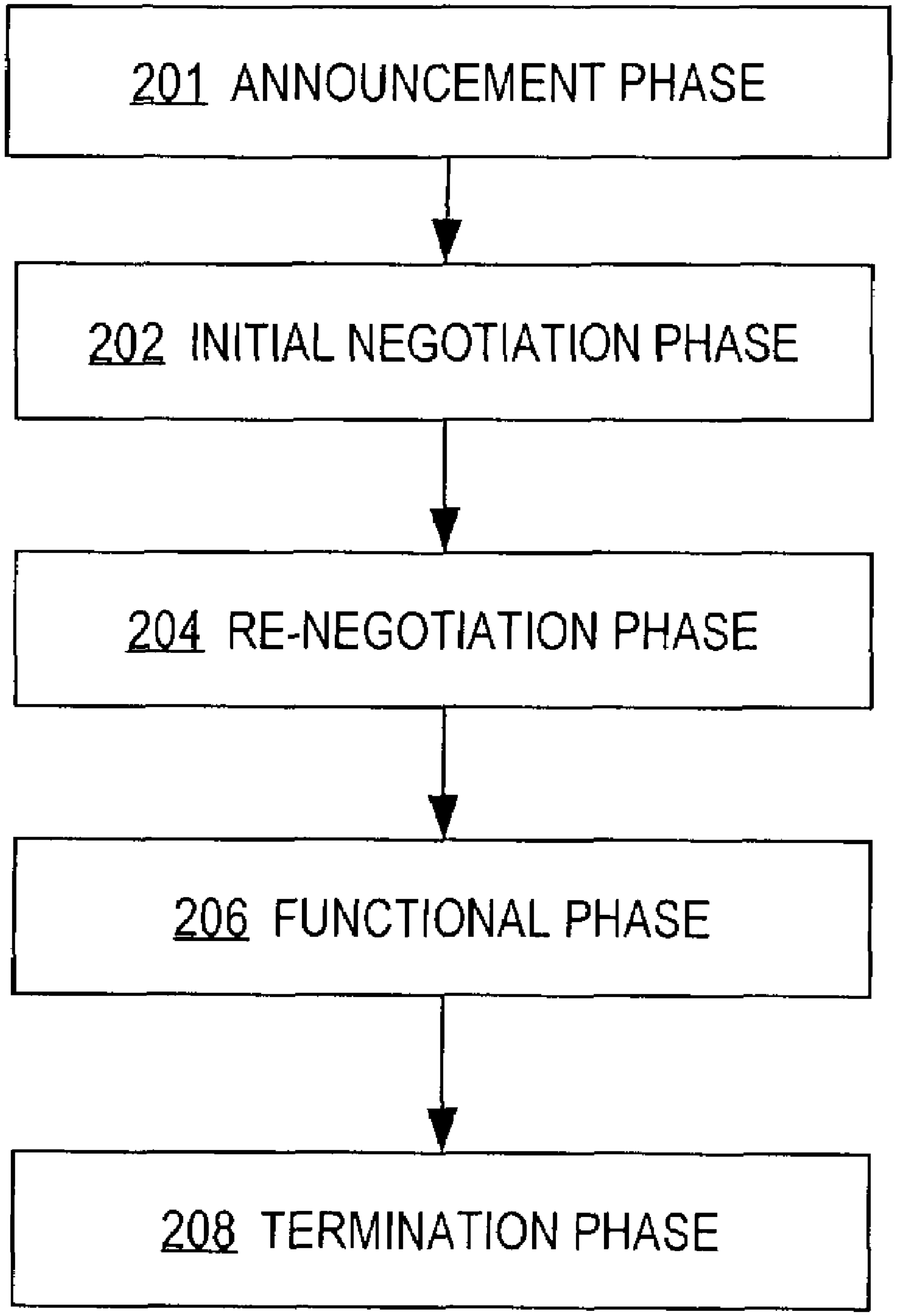
FIG. 2 is a flow diagram showing a high level overview of a process of negotiating a nature of coupling between components.

FIG. 2 is a flow diagram showing a high level overview of a process of negotiating a nature of coupling between components. In block 201, an announcement phase occurs. In block 202, an initial negotiation phase is performed. In block 204, a re-negotiation phase occurs, which may be repeated as needed. In block 206, a functional phase is performed in which components perform native functions with the negotiated coupling. In block 208, a termination phase occurs. Details of example embodiments of each phase are described in subsequent sections herein.

Embodiments may be implemented using a variety of infrastructure technologies. For example, a CORBA-based implementation may pass objects representing the functional state and coupling context among components in the form of values. Typically, the degree of coupling of components in a CORBA-based solution initially would be fairly statically defined by the Interface Definition Language (IDL) associated with the CORBA implementation; however, the degree of coupling could be relaxed by passing coupling information among components using XML.

Other embodiments may use a platform supporting mobile agents, such as JINI, or platforms supporting nomadic code. The latter offer enabling services to handle process migration. These services can be leveraged to provide adaptive coupling. For example, JINI allows fine-grained specification that can capture the properties specified herein, and JINI also supports abstraction design and implementation of aggregated entities through design patterns. Object-oriented design patterns, such as the "facade" design pattern, may be used in an implementation.

The dynamic adaptive coupling approach described herein has numerous applications and benefits. Components may configure their interactions under continuously changing and/or unpredictable solutions. Components that use adaptive coupling are more manageable and more flexible to unexpected behavioral changes. Components using adaptive coupling handle performance degradation more easily, and allow a smooth graceful degradation, by continuously adapting their interactions capabilities to face a particular environmental constraint. Components using adaptive coupling are more suitable for the secure, dynamic and flexible coordination of resource sharing, because adaptive coupling allows flexible and continuous adaptation.

Further, components that use adaptive coupling can handle their dependencies on other components/systems by adjusting to varying circumstances. For example, components can prepare their resources to handle most efficiently the workload, the reservations, etc. Components can optimize their processing by adapting their interactions using feedback control mechanisms.

Adaptive coupling also may become a basic mechanism for specifying and implementing autonomic systems that require adaptation among system components, and autonomous systems, where the adaptation occurs in response to another component or system environment. Finally, adaptive coupling can be a basic mechanism to elaborate advanced management policies for service level agreement monitoring and control under user-based quality of service requests and network performance.

Figure 3A:
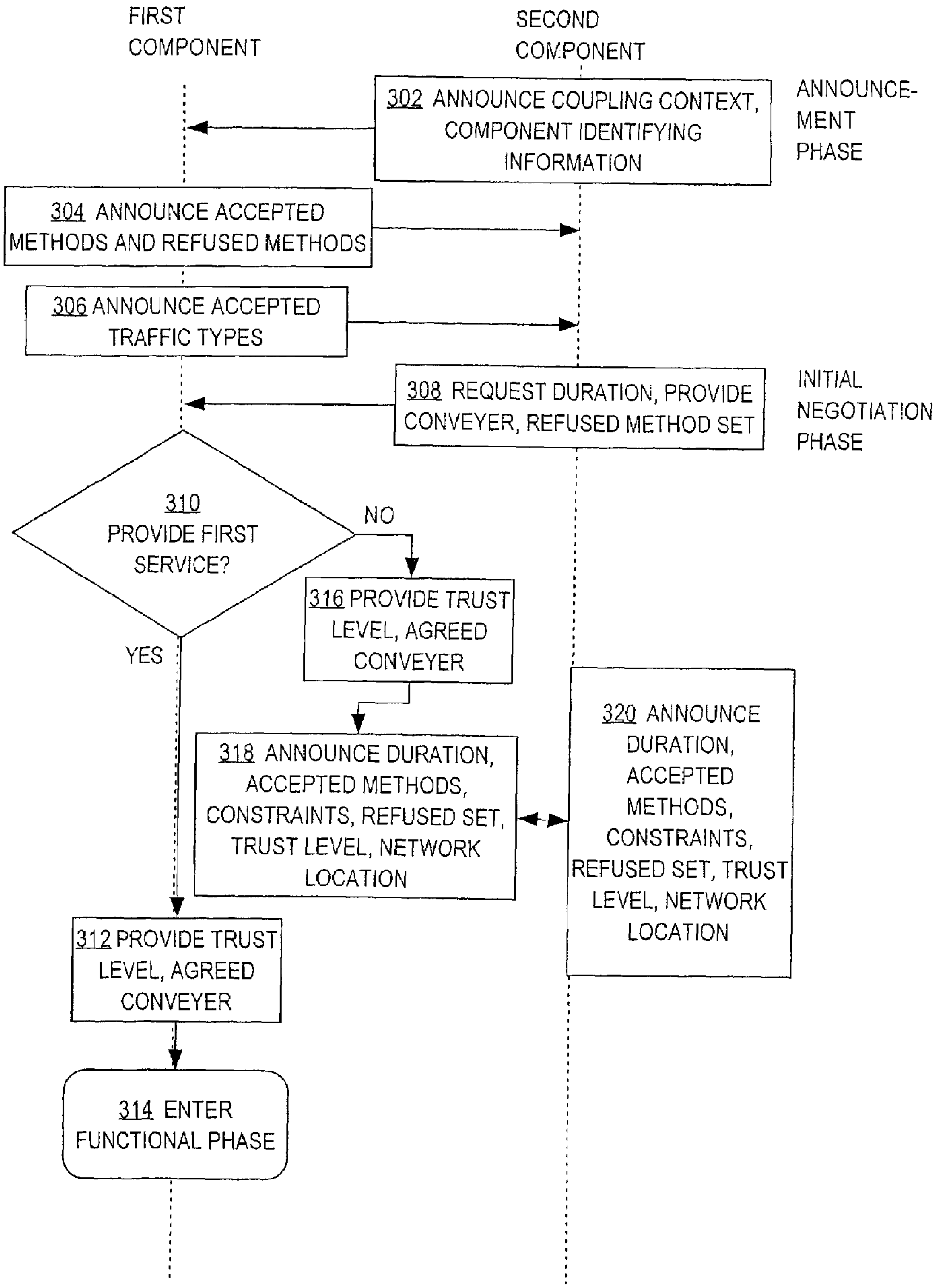
FIG. 3A is a flow diagram that illustrates a high level overview of one embodiment of a method for adaptively coupling components.
Figure 3B:
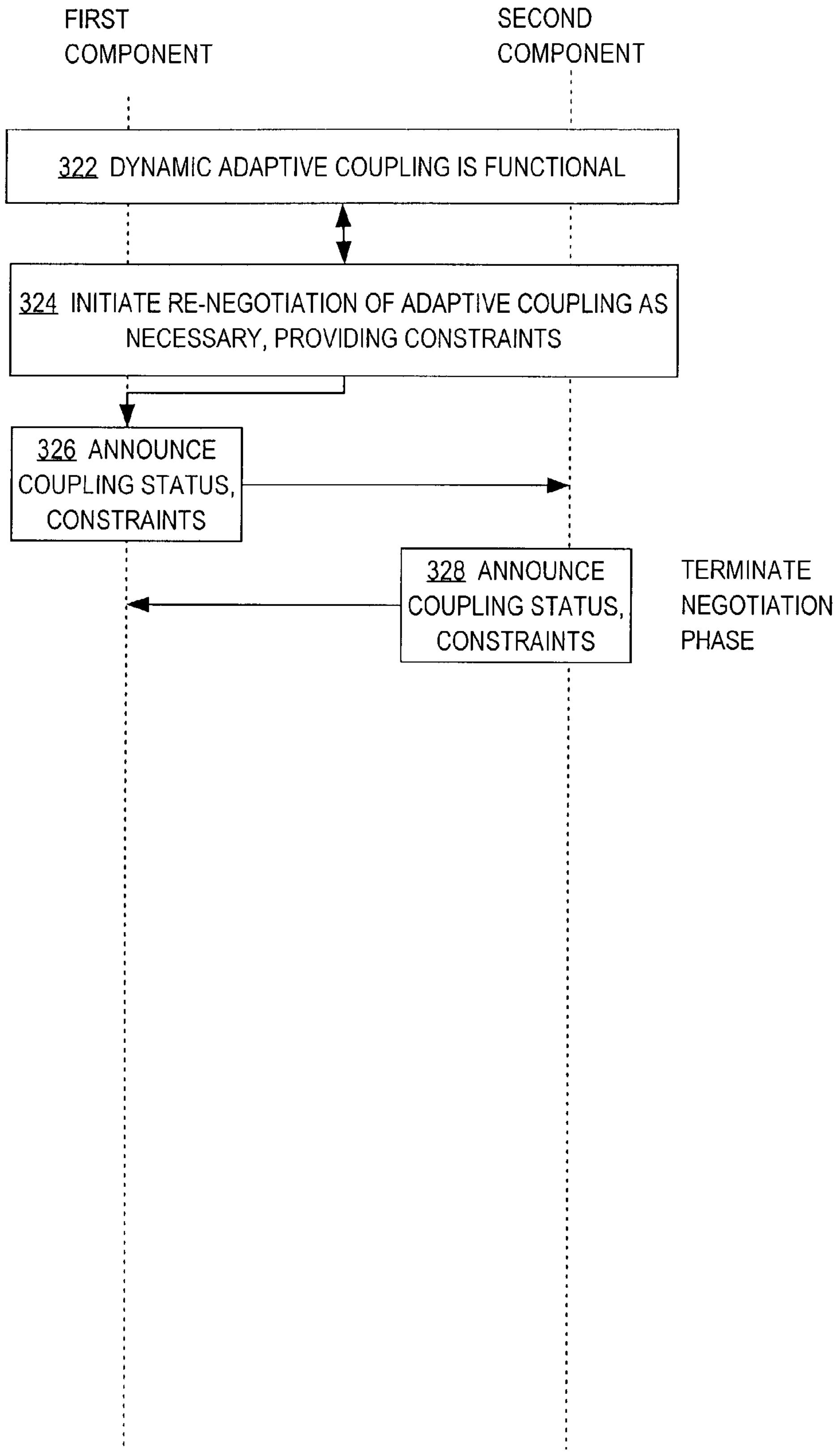
FIG. 3B is a flow diagram of further steps in the process of FIG. 3A.

3.0 Dynamic Adaptive Coupling—Details of an Embodiment 3.1 Method of Negotiating Dynamic Adaptive Coupling FIG. 3A is a flow diagram that illustrates a high level overview of one embodiment of a method for adaptively coupling components; FIG. 3B is a flow diagram of further steps in the process of FIG. 3A. The process of FIG. 3A, FIG. 3B may be used in negotiations of dynamic adaptive coupling among the components of FIG. 1A, FIG. 1B, or in other contexts.

Referring first to FIG. 3A, at block 302 an announcement phase initiates in which one component, such as the second component, announces a coupling context and provides component identifying information. In one embodiment, block 302 involves issuing a request that comprises a context-type, interface value, entity value, trust-level value, and data value. The request refers to features of the first component that the second component is requesting to use. In one specific embodiment of a request, a <context-type> can be either computational, control, test, decision; <interface> is either <interface_type> or <interface_name>, wherein <interface_type> can be winSockAPI, BerkeleySocketsAPI, etc., and <interface_name> can be any name in a name space; in this case it will be interface_i (with i=1 . . . n).

Further, an <entity> can be any component or entity name in a known name space. For example, referring again to FIG. 1B, different entity names may uniquely identify notification processes 160, 170, respectively. A <trust_level> can be high, medium or low, and represents a minimum acceptable trust level that is proposed by the second component for its interactions with the first component. For example, in the case of a request to perform a structural change on a component, such as software, the trust_level must be high. Other trust levels or schemas may be used. In general, an initiating component sets the level of trust for a potentially accepted interaction.

A <data> value may refer to a <data_type> or <volume>, wherein <data_type> specifies what kind of information is going to be exchanged, such as streaming media, flat files, processes, etc., and <volume> is a value indicating, for example, the total length of the estimated exchanged data.

In block 304, the first component issues a response that announces accepted methods and refused methods. Accepted methods are those methods that the first component can perform and agrees to make available to the second component. Refused methods are methods that the first component can perform but refuses to make available.

In one embodiment, the response of block 304 comprises an interface value, trust-level value, accepted-methods list, and refused-set. The <interface> value has the same structure as the request of block 302; however, the type value and the name value may be different. It is assumed that an offer guarantees a request, that is, the offer is a subtype or a subset of the response of block 304. This refers mainly to interface inheritance tree. The <trust_level> value is equal or less than that of the request of block 302.

The <accepted_methods> value contains only the methods that are allowed through a potential coupling interaction. For example, in FIG. 1B, when updating service 182 is negotiating coupling with process instances 160, 170 that are instances of C-NOTE, the methods insert_component and remove_component are examples of accepted methods of the updating service. The <refused_set> is based on a trust level. For example, one component may refuse a particular function. As a specific example, if the trust level is less than medium, use of the remove_component method may be prohibited.

In block 306, a negotiation phase begins; the first component issues a response that announces traffic types that accepts. In one specific embodiment, the response comprises a trust_level, list of accepted methods, and accepted traffic type value. The <trust_level> announces a level of trust that the first component accords to the second component. According to the type of a calling component, a called component may tune the trust level to disallow a calling component to operate across all operations or methods available in the called component. The <accepted_methods> value specifies a set of methods that are accepted for interaction. Further, the <accepted_traffic_type> value specifies, for accepted methods, that only particular types of traffic may be accepted. For example, if a component offers a management interface that sends SNMP messages, the <accepted_traffic_type> value may specify that only UDP traffic will be accepted.

In block 308, the second component responds to the announcement of block 306 by issuing a request that includes duration of the proposed coupling, an announcement of a conveyer method that will be used to communicate data among the components, and a set of refused methods. In one embodiment, a request in block 308 comprises a <duration> value; based on the response on the accepted_traffic type, the caller may adapt the duration of coupling. Using a <conveyer> value, a component can set the way that the two components interact with respect to dynamic adaptive coupling. The components negotiate to agree on one of a plurality of conveyer mechanisms, such as <message assing>, <data_sharing>, <object_assing>, <object_sharing>, <agent_passing>, <service_invocation>, <voting_joken>, <object_views>, etc.

Using a <refused_set> in the request of block 308 the second component may ask the first component to reconsider the refused_set that was proposed in block 304, based on the agreement reached with respect to the conveyer type. For example, if the agreed conveyer type is data_sharing, then a modify method must not to be in the refused set; if the agreed conveyer is agent-passing, then a run_agent method must not be in the refused_set.

At block 310, the first component determines whether it can provide requested services to the second component based on the information in the request of block 308. If so, then at block 312 the first component reports the agreed-upon trust level and conveyer to the second component.

The functional phase can be entered at this point, as indicated by block 314.

In block 312, a response may comprise a conveyer value and a trust level value. Using the <conveyer> value, a first component may respond with a conveyer mechanism that makes the coupling less strong. For example, the second component may propose an object-view mechanism, but the first component may accept only the object-sharing mechanisms, due to the fact that view composition functionality is not implemented in that component. For example, a C-NOTE component only accepts the first two types of conveyer identified above through the computational interface, but accepts object passing through the decision interface. In fact, in this case, the objects are rules.

Using the <trust_level> value, a first component may re-negotiate the trust level between itself and the second component, for example, to limit access through certain methods. For example, if the interface type is decisional, then not all updating services in the network may be allowed to modify a particular component; only dedicated updating servers, such as updating service 182, may have the privilege to launch updates to particular components to avoid updating conflicts.

Alternatively, if the test of block 310 fails, then in block 316 the first component still reports the trust level and conveyer, but in block 318 and block 320, the first component and second component enter a re-negotiation sub-phase in which they exchange coupling information iteratively until a satisfactory level of coupling is reached. The re-negotiation phase may refer to the parameters already presented in the above phase. However, only a subset of particular features might be re-negotiated. Thus, from the functional state, components with a dynamically adaptive coupling may pass into re-negotiation, at the initiative of either component. The may negotiate already agreed upon features, or other features considered by default or not initially to be negotiated.

The re-negotiation phase involves an exchange of values that include coupling <duration>, <accepted_methods>, <constraints>, <refused_set>, <trust_level>, and <network_location>. In this embodiment, network location can be negotiated, meaning that a first component might not accept coupling from components situated at particular locations. As an example, negotiating network location may be used for penalizing updating services that cause a coupling to enter a suspended state, as a result of errors, expired time, or violation of the established type of coupling. As a specific example, only updating services 182 situated in a management domain could be allowed to update C-NOTE instances in a particular network.

Referring now to FIG. 3B, in the functional phase the first component and second component may signal that the negotiation has been completed, and that the functional phase is entered, by setting the coupling state value to "established". In the functional phase, dynamic adaptive coupling is function as indicated in block 322, and components perform processing according to their design.

During the functional phase, as shown by block 324, initiation of a renegotiation phase may be signaled by either coupled component announcing that the state of the coupling is "negotiation" or "adapting." When re-negotiation is requested, a condition or constraint leading to the need for re-negotiated may be communicated. For example, if updating service 182 needs to insert a new module in C-NOTE process instances 160, 170 and a time-out occurs, or if updating service 182 is re-launching a C-NOTE process instance 160, 170 after an update fails, then instances 160, 170 may refused to further communicate with the update service 182 at a particular network location, or re-negotiate the original coupling parameters.

In an embodiment, only the constraints are communicated for initiation of re-negotiation, because an instance of the coupling has been agreed upon previously and only certain parameters must be tuned. A <constraints> value may communicate constraints among the parameters already agreed upon in a previous negotiation. Thus, the constraints are provided used as hints of what should be reconsidered for negotiation. Any prior negotiated parameter can be an argument for a set of constraints.

Block 326 and block 328 represent a termination phase. Either component, or a third party, may trigger the termination phase. Upon termination, the components announce, to a management system, the status of the coupling and any related constraints. In one specific embodiment, the announcement includes a <coupling_status> value selected from among <allowed>, <initialization>, <established>, <negotiation/adapting>, <in_test>, <passive>, <suspended>, <not_allowed>, etc. For example, <established> means that the coupling negotiation succeeded, but the interaction didn't yet take place; in other cases, when a banned update service 182 tries to update a particular C-NOTE process instance 160, 170, the status "not-allowed" is assigned to the coupling by the first component.

Further, each termination announcement includes a <constraints> value that specifies certain conditions when a particular status is entered. For example, if either C-NOTE process instance 160, 170 is undergoing tests, the constraints may prescribe what kind of test and for how long a particular instance is not able to enter into an adaptive coupling for the purpose of receiving updates. This could occur, for example, when an update of the parser of an instance 160, 170 requires performing a test for the newly introduced commands.

In general, termination may be normal or abnormal. When termination is abnormal, constraints express concrete conditions leading to the termination. When termination is normal, the constraints may report on the number of renegotiations, as an index for the stability of a particular coupling.

For example, when an update performed by update service 182 succeeds and coupling status is terminated, the current duration and the number of re-negotiations may indicate the quality of the coupling. As another example, when the coupling status is becomes suspended after a failure to set a coupling between update service 182 and a CNOTE instance 160, 170, the method "update" is no longer accepted from that particular updating service server.

3.2 Details of Example Coupling Context

Referring again to FIG. 3A, block 302, according to one embodiment, a coupling context comprises a plurality of associated data values. For purposes of description, the coupling context may be described by a grammar in Backus Naur form (BNF) as shown in Table 1:

TABLE 1

COUPLING CONTEXT

| Line No. | Content of Coupling Context |
|---|---|
| 1 | context_type::=computation ǀ control ǀ testǀ decision |
| 2 | data::=<data_type><volume> |
| 3 | interface::=<interface_type><interface_name> |
| 4 | component::=<component_type><component_name> |
| 5 | duration::=[time1, time2] ǀ [time1, delta] ǀ <delta>, where delta is negotiable |
| 6 | refused_set::=<component_a_{service}> <component_b_{service}> |
| 7 | trust_level::=high ǀ medium ǀ low |
| 8 | location::=<physical_location><logical_location> <network_location> |
| 9 | conveyer::= <message_passing><data_sharing><object_passing> <object_shadng><agent_passing><service_invocation> <voting_token><object_views> |
| 10 | accepted_method::=RPC ǀ RMI ǀ . . . ǀ . . . |
| 11 | accepted_traffic_type::= IP ǀ TCP ǀ HTTP ǀ MPLS ǀ IPSec ǀ . . . ǀ . . . |
| 12 | constraints::= {rule} |
| 13 | where: |

TABLE 1-continued

COUPLING CONTEXT

<table>
<tr><th>Line No.</th><th>Content of Coupling Context</th></tr>
<tr><td>14</td><td>component_x_service::= {serv1, serv2, serv3, . . . , . . . servn}</td></tr>
<tr><td>15</td><td>data_type::=INTEGER | REAL | . . . | . . .</td></tr>
<tr><td>16</td><td>refusal_set::= {serv1, serv2, . . . }</td></tr>
<tr><td>17</td><td>logical_location::=<area_zone><<network>< sub_networks>< . . . ></td></tr>
<tr><td>18</td><td>physical_location::=<room><ne_name><chassis> <slot><physical_port></td></tr>
<tr><td>19</td><td>network_location::=<network_name><sub_network_name> <network_access_point><policy_access_point></td></tr>
<tr><td>20</td><td>service_invocation::=<event_subscription><policy_subscription> <server_request></td></tr>
<tr><td>21</td><td>rule::=<rule1> | <rule2> | <rule><operator2 ><rule> | NOT<rule></td></tr>
<tr><td>22</td><td>rule1::=<context_attribute><operator1><value></td></tr>
<tr><td>23</td><td>rule2::=<context_attribute><operator2><context_attribute></td></tr>
<tr><td>24</td><td>operator1::=< | > | = | =/ | <= | >=</td></tr>
<tr><td>25</td><td>operator2::=AND, OR</td></tr>
</table>

The coupling context depicted in Table 1 comprises two main parts. The first part, from lines 1 to 12, defines information that may be communicated between components that are dynamically negotiating the nature of their coupling. The second part, from lines 13 to 25, refines the definition of the information in lines 1 to 12. For example, data is defined on line 2 as "<data_type><volume>" and "data_type" is defined on line 15 as "INTEGER|REAL| . . . | . . . ".

On line 1, the "context_type" defines the context of the interaction between components. Among other things, the context_type between two components may be computation, decision, test, or control. One component adding a function to another component is an example of the computation context_type. An example of the decision context_type is one component causing another component to perform according to a different set of rules. To illustrate, the rules may require the component receiving the rules to different thresholds for evaluating its performance. One component monitoring another component that is performing tests is an example of the test context_type.

On line 2, "data" defines the type and the amount of data that may be transmitted between components. For example, if the context_type is test, then the component performing tests may provide test results to the component monitoring the tests. In this case, the data_type may be "test_suite" and the volume may indicate the amount of data transferred of type "test_suite".

On line 3, "interface" defines the types of interfaces for services that components may request or provide and designates a particular interface of that type with the interface_name. For example, if there are several Ethernet cards in a particular piece of hardware, the interface_type may be "ethernet_card" and the interface_name may be a number indicating a particular Ethernet card in the particular piece of hardware. In this case, the interface for the first Ethernet card could be defined by "ethernet_card.1" whereas the interface for the second Ethernet card could be defined by "ethernet_card.2". In another example, a module may have an SNMP interface. In this case, there would be only one SNMP interface, which could be defined by "SNMP.1".

On line 4, "component" defines the type of the component and designates a particular component of that type with the component name. For example, the component_type may be "process" and the component_name may be "p1". In this case, a particular process may be defined by "process.p1".

On line 5, "duration" defines the length of time that a service is requested or provided. The duration may be defined in at least a couple of ways. First, the service may be requested or provided starting at time1 and ending at time2. For example, the service may be requested starting at 1:00 pm on Feb. 28, 2003 and ending at 4:00 pm on Feb. 28, 2003. Second, the service may be requested or provided starting at time1 and ending at time1+delta. To obtain the same results as the first example, time1 would be 1:00 pm on Feb. 28, 2003, however, the delta would be 3 hours resulting in an end time of 4:00 pm on Feb. 28. Not only may the duration be negotiable, but also the delta itself may be negotiable.

On line 6, "refused_set" defines the services that are refused to particular components. The particular services that are refused to a particular component, e.g., component_x_service, are defined on line 14. For example, serv1 may be refused to component_a, e.g., "component_a_serv1, whereas serv2 may be refused to component_b, e.g., "component_b_serv2". On line 16, the union of all services refused to another component is defined by "refusal_set". For example, if component_a and component_b are the only components that component z interacts with and component_a is refused serv1 and component_b is refused serv2, then the "refusal_set" for component z is {serv1, serv2}.

On line 7, "trust_level" defines the level of trust that one component has for another component. According to one embodiment, the level of trust may be high, medium, or low. For example, a first component may transmit a message to a second component indicating that it has a high level of trust for the second component. According to one embodiment, the level of trust between the two components is determined by taking the minimum trust level between the two components. To continue the example, if the second component transmits a message back to the first component indicating that it has a medium level of trust for the first component, then the trust level between the components is medium. According to another embodiment, "trust_level" may be defined ordinally. For example, the trust_level may be a number between 0 and 10 with 0 being the lowest trust level and 10 being the highest trust level.

On line 8, "location" defines the location of a component. According to one embodiment, the location of the component may be a physical location (physical_location), a logical location (logical_location), or a location within a network (network_location). Referring to line 17, the logical_location, among other things, may be a network area or zone, a particular network, or a subnet work within a network. Referring to line 18, the physical_location, among other things, may be a room, a network element name, a chassis in a router, a slot in a router, or a physical port in a router. Referring to line 19, the network_location, among other things, may be a particular network, or a sub-network within a network, a network access point, or a policy access point.

On line 9, "conveyer" defines the mechanism for communicating between the components once the initial phase of negotiation has completed and the service is provided. For example, the service may be provided by passing messages (message_passing) or sharing data (data_sharing), among other things, between the two components. Other examples of conveyance, include but are not limited to, passing objects (object_passing), sharing objects (object_sharing), passing agents (agent passing), invoking services (service_invocation), etc. "Service_invocation", as defined on line 20, may be among other things a subscription to an event (event_subscription), a subscription to a policy (policy_subscription), or a request to a server (server_request).

On line 10, “accepted_method” defines the methods that a particular component accepts for communications. For example, the component may accept, among other things, remote procedure calls (RPC) or remote method invocations (RMI).

On line 11, “accepted_traffic_type” defines the protocols that a particular component may use for communications with other components. For example, the component may be able to communicate using, among other things, IP, TCP, HTTP, etc.

On line 12, “constraints” defines the rules that constrain the behavior of a component. The rules are further defined on lines 21 to 25 so that conditional logic, such as AND, OR, >, <, =, etc., may be used for defining the rules. A component may use “constraints” to communicate to another component what rules constrain it or a component may use “constraints” to negotiate what rules govern the behavior of another component. For example, a component may communicate that it will only provide test data if the volume of the data is less than a certain amount and its CPU utilization is below a certain threshold.

3.3 Examples of Use

A specific example of use is now provided, with reference to FIG. 1B. In this example, first component comprises notification process instance 160 and a second component comprises update service 182. The first component is providing access to its data to enable the update service 182 to update an executable associated with the first component. The update service 182 is requesting to update an executable associated with the first component, such as poller 154B or parser 156B.

Table 2 summarizes messages that are created and communicated by the components as part of performing negotiation of dynamic adaptive coupling; references to steps indicate when the messages are created, with respect to steps of FIG. 3A, FIG. 3B.

TABLE 2

SUMMARY OF MESSAGES IN OPERATION

| Phase name | Provider Component 1 (cl) (C-NOTE) | Requestor Component 2 (c2) (Updating Service) |
|---|---|---|
| Initial Negotiation Phase | Step 306 Response: <interface><trust_level> <accepted_methods><refused_set> <accepted_traffic_type> | Step 308 Request: <context_type><interface><component> <trust_level><data><duration> <conveyer><refused_set> |
| Terminate Negotiation phase | | Step 328 Initiator: <coupling_status> <constraints> |
| Functional Phase | Step 322 Component receives update to poller executable | Step 322 Component transmits update to poller executable |
| Re-negotiation sub-phase during functional phase | Step 318 Initiator: <trust_level <duration><accepted_methods> | |
| Terminate Negotiation phase | | Step 328 Initiator: <coupling_status> <constraints > |
| Functional Phase | Step 322 Component receives update to poller executable | Step 322 Component transmits poller executable |

In the Initial Negotiation Phase, a request is issued from the second component to the first component in which the update service 182 requests to update code in process instance 160. In the request, the <context type> is computation; the <Interface> value has sub-values <interface_type>=winSockAPI and <interface_name>=1; the <component> value has sub-values <component_type>=updating_services and <component_name>=C2 (for “second component.” The <trust_level> value is high. The <data> value specifies a size for the new version of the poller; for example, the <data> value indicates that the <data_type> is binary code, and the <volume> is 40 Kbytes. The <accepted_methods> list includes update_component, remove_component. The <accepted_traffic_type> value is TCP.

The process instance 160 then sends a response to the update service 182 indicating whether the process instance 160 will allow update service 182 to update the code. In the response, an <interface> value specifies an <interface type> as winSockAPI and an <interface_name> as 1. The <trust_level> is high. The <accepted_methods> list specifies insert_component (for inserting the new poller) and remove_component. The <duration> value is 2 hours. The <conveyer> value is <message_passing>.

In the termination of negotiation phase, assume that update service 182 seeks to terminate coupling. The update service 182 sends a termination message to the process instance 160 that indicates a <coupling_status> is established.

In the Functional Phase, update service 182 transmits code for the new version of the poller 154B of process instance 160. However, the functional phase is interrupted to perform a re-negotiation sub-phase. In the re-negotiation sub-phase during the functional phase, process instance 160 sends a message to the update service 182 including a <duration> value of 2 hours, meaning that the update will take two hours or less. The message also specifies a <trust_level> of medium, and the <accepted_methods> list includes update_component.

To terminate the re-negotiation phase, the update service 182 sends a message to the process instance 160 indicating a <coupling_status> of established. The components then return to the functional phase in which the update service transmits the code for the new version of the poller.

As another example of use, in one implementation, adaptive coupling as described herein may support resource negotiation under the JINI platform. For example, a user_agent and printer_agent may negotiate a tight coupling. Based on this nature of coupling, at the moment that printing is invoked, the user_agent knows exactly the location, name and the properties of a default printer. While a user through its user_agent can statically select among various printers, the coupling is not relaxed.

To achieve a relaxation in coupling, the user_agent may pass in a negotiation state, and select one of a plurality of printers that is most suitable for the then-current printing job. For example, negotiation may result in selecting a color printer, one that is more reliable, one that has more capacity, one that is faster, has fewer queued jobs, one that has proximity to the user location, accessibility from the user location, etc.

Further, a loose coupling could be negotiated when a user_agent initiates a nomadic agent in the name of the user, such that the nomadic agent is empowered with the user profile and negotiation instructions for trying to identify the most suitable printer for a particular "print" command. The least coupling could occur when a user sends a "print" command to a printer and, if a "paper tray empty" error occurs, the original file is either sent to another printer, or continued from the interruption point and printed elsewhere.

As a second example, a security approach is now presented. When using HTTP for network communications, port 80 is commonly opened in an enterprise firewall to allow Internet access. However, port 135 (RPC Endpoint Mapper) is typically closed for security reasons. Therefore, any RPC-based interaction attempt will fail if the interaction parts are separated by such a firewall. Thus, even if a design specification intended an adaptive coupling, such coupling is not always achievable. In this case, adaptive coupling is only allowed across a particular port.

3.4 Improvements Over Past Approaches

In a component-based distributed system, component interactions are the most crucial piece of adaptability, from the perspective of component interface design and the nature of the component coupling. The approaches herein address the nature of component coupling. New concepts for coupling and new mechanisms to define, use and implement dynamic adaptive coupling have been presented. While past coupling approaches for analysis, monitoring and control mainly have been code-based, revealing only syntactic dependencies, the present approach captures coupling semantics and allows several ways to monitor and control large distributes systems.

There are many potential uses for the approaches herein. The examples given herein have been intended to show that:

Components may configure their interactions under continuously changing and/or unpredictable solutions;

Components adopting the adaptive coupling are more manageable and more flexible to unexpected behavioral changes;

Components using adaptive coupling handle easier performance degradation, and allow a smooth graceful degradation, by continuously adapting their interactions capabilities to face a particular environmental constraint;

Components using adaptive coupling are more suitable for the secure, dynamic and flexible coordination of resource-sharing by individuals, institutions and other entities, as it allows a flexible and continuous adaptation;

Components/systems adopting a adaptive coupling can handle their dependencies on other components/systems adjusting to varying circumstances, i.e., preparing their resources to handle most efficiently the workload, the reservations, etc.;

Components/systems can optimize their processing through adapting their interactions, using feedback control mechanisms;

Adaptive coupling is seen as a basic mechanism for specifying and implementing autonomic systems, where the basis is mostly an adaptation among system components, and autonomous systems, where the adaptation (decisively leading to loosely coupling) is against the component/system environment. Adaptive coupling is a basic mechanism to elaborate advanced management policies for service level agreement monitoring and control under user-based quality of service requests and network performance.

4.0 Implementation Mechanisms—Hardware Overview

Figure 4:
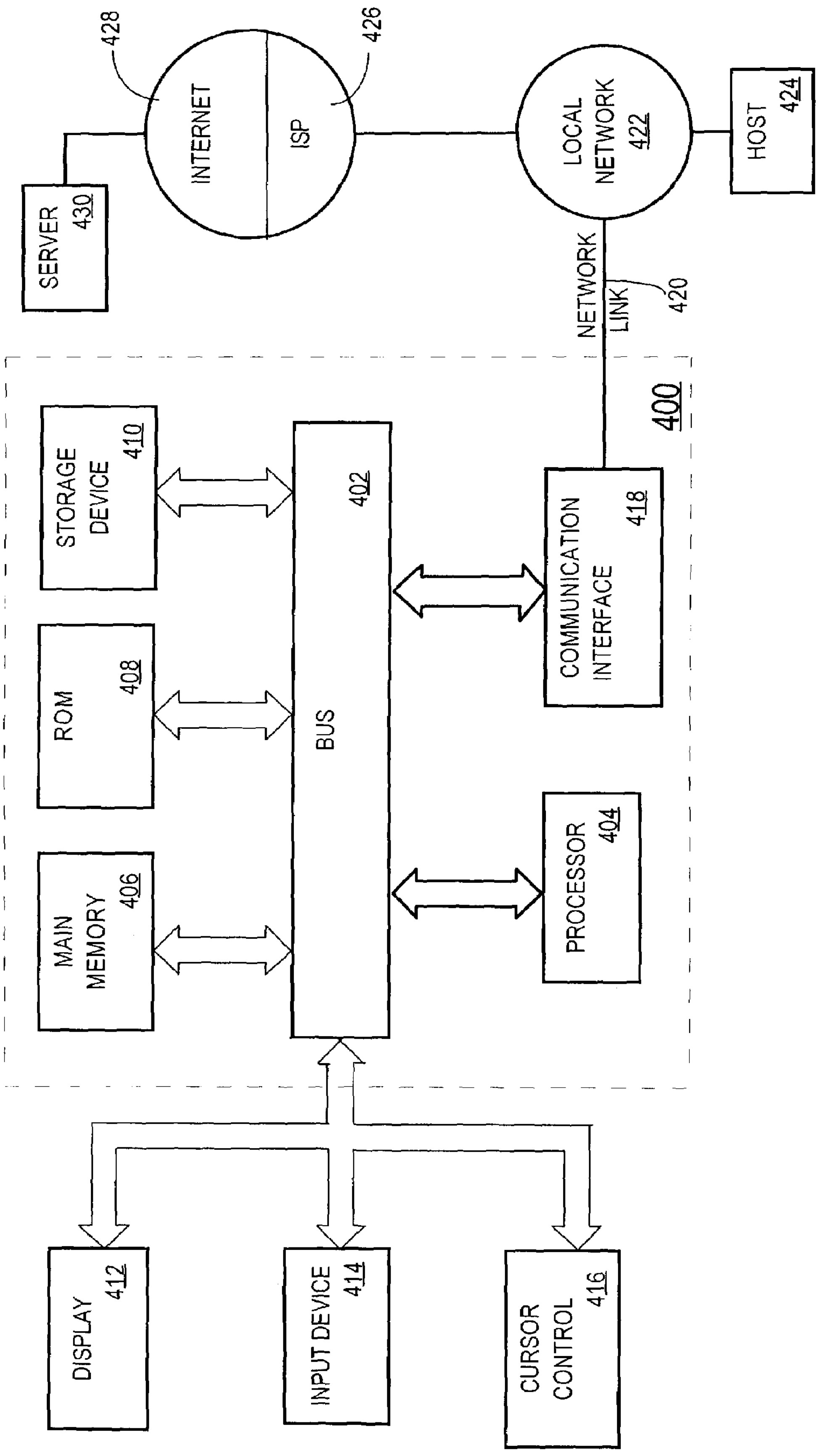
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for adaptively coupling processing components in a distributed system. According to one embodiment of the invention, adaptively coupling processing components in a distributed system are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for adaptively coupling processing components in a distributed system as described herein.

Processor 404 may execute the received code as it is received, or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of dynamically adaptively coupling a first component and a second component in a distributed system, wherein the second component requests an interaction with the first component, the method comprising the computer-implemented steps of:

sending a service access request to access a first service of the first component, wherein the service access request specifies parameters relating to a proposed level of coupling between the first component and the second component;

receiving a service response from the first component, wherein the service response specifies counter-proposed parameters relating to the proposed level of coupling between the first component and the second component;

determining whether the service response indicates that the first service response indicates that the first service may be provided; and if the first service may be provided, then establishing an agreed-upon level of coupling between the first component and the second component; and interacting with the first component to receive the first service from the first component, wherein the step of interacting further comprises the step of receiving a message from the first component to renegotiate the first service, wherein the message offers a second dynamically negotiable service.

2. A method as recited in claim 1, wherein the service request comprises comprising lists of one or more accepted methods, refused methods, and accepted traffic types.

3. A method as recited in claim 1, wherein the service request comprises one or more values announcing a duration, accepted methods, constraints, refused methods, trust level, or network location associated with the first component or the second service.

4. A method as recited in claim 1, wherein the service response comprises one or more counter-proposed values announcing a duration, accepted methods, constraints, refused methods, trust level, or network location associated with the first component or the second service.

5. A method as recited in claim 1, further comprising the step of announcing a coupling context as part of sending the service access request.

6. A method as recited in claim 1, further comprising the step of announcing a coupling context as part of sending the service access request, wherein the coupling context comprises a plurality of associated data values that may be described in Backus-Naur form as:

context_type::=computation|control|test|decision data::=<data_type><volume> interface::=<interface_type><interface_name> component::=<component_type><component_name> duration::=[time1, time2]|[time1, delta] |<delta>, where delta is negotiable refused_set::=<component_a_{service}><component_b_{service}> trust_level::=high|medium|low location::=<physical_location><logical_location><network_location> conveyer::=<message_passing><data_sharing><object_passing><object_sharing><a gent passing><service_invocation><voting_token><object_views> accepted_method::=RPC|RMI| . . . | . . .

accepted_traffictype::=IP|TCP|HTTP|MPLS|IPSec| . . . | . . .

constraints::={rule} where:

component_x_service::={serv1, serv2, serv3 . . . , . . . servn} data_type::=INTEGER|REAL| . . . | . . .

refusal_set::={serv1, serv2, . . . } logical_location::=<area_zone><<network><sub_networks>< . . . > physical_location::=<room><ne_name><chassis><slot><physical_port> network_location::=<network_name><sub_network_name><network_access point><policy_access_point> service_invocation::=<event_subscription><policy_subscription><server_request> rule::=<rule1>|<rule2>|<rule><operator2><rule>|NOT<rule> rule1::=<context_attribute><operator1><value> rule2::=<context_attribute><operator2><context_attribute> operator1::=<|>=|=/|<=|>= operator2::=AND, OR.

7. A method as recited in claim 1, further comprising the steps of:

determining that the first service needs to be renegotiated;

creating a second request for a second dynamically negotiable service from the first component;

receiving a second response from the first component comprising one or more values announcing a duration, accepted methods, constraints, refused methods, trust level, or network location associated with the first component or the second service;

determining whether the second response indicates that the second service may be provided; and if the second service may be provided, then interacting with the first component to obtain the second service from the first component.

8. A method as recited in claim 7, wherein the step of determining that the first service needs to be renegotiated is performed in response to determining that the first service may not be provided.

9. A method as recited in claim 7, wherein the step of determining that the first service needs to be renegotiated is performed during the step of interacting with the first component to receive the first service from the first component.

10. A method as recited in claim 1, wherein each component comprises software, hardware, a combination of hardware and software, a router, a module, a process, an agent, an Object Oriented class, an instance of an Object Oriented class, an algorithm, a program, or a system.

11. A method as recited in claim 1, wherein the step of interacting further comprises the step of transmitting or receiving a message indicating negotiation of services is terminated.

12. A method as recited in claim 1, wherein the step of interacting further comprises the step of transmitting or receiving a termination message indicating negotiation of services is terminated, and wherein the termination message includes a constraint value that indicates a reason for termination.

13. A method as recited in claim 1, wherein the step of interacting further comprises the step of transmitting or receiving a termination message indicating negotiation of services is terminated, and wherein the termination message includes a constraint value that indicates a negotiated parameter value that resulted in termination.

14. A method as recited in claim 1, wherein the steps of the method are performed by a policy kernel of the second component.

15. A computer-readable storage medium comprising one or more sequences of instructions stored thereon for dynamically adaptively coupling a first component and a second component in a distributed system, wherein the second component requests an interaction with the first component, which instructions, when executed by one or more processors, cause the one or more processors to perform the computer-implemented steps of:

sending a service access request to access a first service of the first component, wherein the service access request specifies parameters relating to a proposed level of coupling between the first component and the second component;

receiving a service response from the first component, wherein the service response specifies counter-proposed parameters relating to the proposed level of coupling between the first component and the second component;

determining whether the service response indicates that the first service response indicates that the first service may be provided; and if the first service may be provided, then establishing an agreed-upon level of coupling between the first component and the second component; and interacting with the first component to receive the first service from the first component, wherein the step of interacting further comprises the step of receiving a message from the first component to renegotiate the first service, wherein the message offers a second dynamically negotiable service.

16. An apparatus for dynamically adaptively coupling a first component and a second component in a distributed system, wherein the second component requests an interaction with the first component, comprising:

means for sending a service access request to access a first service of the first component, wherein the service access request specifies parameters relating to a proposed level of coupling between the first component and the second component;

means for receiving a service response from the first component, wherein the service response specifies counter-proposed parameters relating to the proposed level of coupling between the first component and the second component;

means for determining whether the service response indicates that the first service response indicates that the first service may be provided; and means for establishing, if the first service may be provided, an agreed-upon level of coupling between the first component and the second component and for interacting with the first component to receive the first service from the first component, wherein means for interacting further comprises means for receiving a message from the first component to renegotiate the first service, wherein the message offers a second dynamically negotiable service.

17. An apparatus for dynamically adaptively coupling a first component and a second component in a distributed system, wherein the second component requests an interaction with the first component, comprising:

one or more processors;

a network interface communicatively coupled to a network for receiving packet flows there from;

computer-readable storage medium comprising one or more sequences of instructions stored thereon for dynamically adaptively coupling a first component and a second component in a distributed system, wherein the second component requests an interaction with the first component, which instructions, when executed by the one or more processors, cause the one or more processors to perform the computer-implemented steps of:

sending a service access request to access a first service of the first component, wherein the service access request specifies parameters relating to a proposed level of coupling between the first component and the second component;

receiving a service response from the first component, wherein the service response specifies counter-proposed parameters relating to the proposed level of coupling between the first component and the second component;

determining whether the service response indicates that the first service response indicates that the first service may be provided; and if the first service may be provided, then establishing an agreed-upon level of coupling between the first component and the second component; and interacting with the first component to receive the first service from the first component, wherein the step of interacting further comprises the step of receiving a message from the first component to renegotiate the first service, wherein the message offers a second dynamically negotiable service.

* * * * *